(12) United States Patent
Katayama et al.

(10) Patent No.: US 11,799,074 B2
(45) Date of Patent: Oct. 24, 2023

(54) ELECTRODE AND NONAQUEOUS ELECTROLYTE SECONDARY BATTERY

(71) Applicant: SANYO Electric Co., Ltd., Daito (JP)

(72) Inventors: Koichi Katayama, Hyogo (JP); Tetsuya Matsuda, Hyogo (JP); Haruya Nakai, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 233 days.

(21) Appl. No.: 16/744,521

(22) Filed: Jan. 16, 2020

(65) Prior Publication Data

US 2020/0274150 A1     Aug. 27, 2020

(30) Foreign Application Priority Data

Feb. 21, 2019     (JP) .................................. 2019-029276

(51) Int. Cl.
*H01M 4/36*     (2006.01)
*H01M 4/62*     (2006.01)
(Continued)

(52) U.S. Cl.
CPC ........... *H01M 4/366* (2013.01); *H01M 4/628* (2013.01); *H01M 4/75* (2013.01); *H01M 2004/027* (2013.01)

(58) Field of Classification Search
CPC ........ H01M 4/366; H01M 4/628; H01M 4/75; H01M 4/62; H01M 10/4235; Y02E 60/10; Y02P 70/50; Y02T 10/70
See application file for complete search history.

(56) References Cited

U.S. PATENT DOCUMENTS

| 8,986,891 B2 * | 3/2015 | Tanaka ................... H01M 4/366 |
| | | 429/233 |
| 2020/0067081 A1 * | 2/2020 | Hirai ..................... H01M 4/366 |
| (Continued) | | |

FOREIGN PATENT DOCUMENTS

| JP | 2016-192338 A | 11/2016 |
| JP | 2017143004 A * | 8/2017 .............. H01M 2/34 |
| (Continued) | | |

OTHER PUBLICATIONS

Machine translation of JP-2017143004-A, published Aug. 17, 2017. (Year: 2017).*
Machine translation of WO-2018179205-A1 (Year: 2018).*

*Primary Examiner* — Allison Bourke
*Assistant Examiner* — Jason Barton (57) ABSTRACT

A negative electrode includes a negative electrode protecting layer that is disposed so as to cover a negative electrode active material layer formed on at least one surface of a negative electrode core in a thickness direction and that has higher electrical resistance than the negative electrode active material layer. The negative electrode active material layer includes a first surface and a second surface. The first surface is formed in a region extending from an edge at one end to a boundary 300 μm away from the edge in a width direction. The second surface is positioned closer than the first surface to the other end. Regarding the negative electrode protecting layer, the average value of the first thickness of a first portion covering the first surface is 1.7 or more times larger than the maximum value of the second thickness of a second portion covering the second surface.

5 Claims, 5 Drawing Sheets

(51) Int. Cl.
*H01M 4/75* (2006.01)
*H01M 4/02* (2006.01)

(56) References Cited

U.S. PATENT DOCUMENTS

2020/0144657 A1* 5/2020 Kifune .............. H01M 10/0459
2021/0194007 A1* 6/2021 Danno .................. H01G 11/24

FOREIGN PATENT DOCUMENTS

| WO | WO-2017138584 A1 * | 8/2017 | ............. H01G 11/26 |
| WO | WO-2018079817 A1 * | 5/2018 | ............. H01G 11/12 |
| WO | WO-2018179205 A1 * | 10/2018 | ............... B05C 5/02 |

* cited by examiner

ELECTRODE AND NONAQUEOUS ELECTROLYTE SECONDARY BATTERY

CROSS REFERENCE TO RELATED APPLICATIONS

The present invention application claims priority to Japanese Patent Application No. 2019-029276 filed in the Japan Patent Office on Feb. 21, 2019, the entire contents of which are incorporated herein by reference.

BACKGROUND OF THE INVENTION

Field of the Invention

The present disclosure relates to an electrode and a nonaqueous electrolyte secondary battery.

Description of Related Art

The nonaqueous electrolyte secondary battery described in Japanese Published Unexamined Patent Application No. 2016-192338 (Patent Document 1) is known as a typical nonaqueous electrolyte secondary battery. The nonaqueous electrolyte secondary battery is a prismatic secondary battery and includes a negative electrode in which a negative electrode active material layer disposed on the negative electrode core is covered with a protecting layer. Specifically, alumina, a binder, and a dispersion medium are mixed together, and thereafter, the mixture is subjected to a mixing and dispersing treatment with a bead mill to produce a protecting layer slurry. Then, the produced protecting layer slurry is applied to the negative electrode active material layer, and thereafter, the dispersion medium is removed by drying to form the protecting layer, which is made of alumina and the binder, on the surface of the negative electrode active material layer.

In the prismatic secondary battery, the surface of the negative electrode active material layer is covered with a low-electroconductivity protecting layer, and thus, a short circuit between the negative electrode active material layer and the positive electrode active material layer that may be caused by an electroconductive foreign object is suppressed, and the safety is improved.

The present inventors found that during processing of an electrode including an active material layer covered with a protecting layer, detachment is likely to occur at a thin end portion of the active material layer in the width direction. If the amount of binder added to the active material layer is increased to improve adhesion, the detachment may be suppressed; however, the electrical resistance of the electrode increases, and thus, for example, output characteristics decrease.

The present disclosure provides an electrode in which detachment of an active material layer is suppressed without increasing the amount of binder, and a nonaqueous electrolyte secondary battery.

BRIEF SUMMARY OF THE INVENTION

An electrode according to the present disclosure includes a strip-shaped core, an active material layer disposed on at least one surface of the core in a thickness direction so as to extend in a longitudinal direction of the core, and a protecting layer that is disposed so as to cover the active material layer and that has higher electrical resistance than the active material layer. The active material layer includes a first surface and a second surface. The first surface faces away from the core in the thickness direction and is formed in a region that extends from an edge at one end of the active material layer to a boundary 300 μm away from the edge in a width direction. The second surface is positioned closer than the first surface to the other end in the width direction. The distance from the second surface to the core in the thickness direction is substantially constant. Regarding the protecting layer, the average value of a first thickness of a first portion covering the first surface in a direction normal to the first surface is 1.7 or more times larger than the maximum value of a second thickness of a second portion covering the second surface in a direction normal to the second surface.

According to the electrode according to the present disclosure, detachment of the active material layer is suppressed.

DETAILED DESCRIPTION OF THE INVENTION

Hereinafter, embodiments according to the present disclosure will be fully described with reference to the attached drawings. When plural embodiments and modifications are described hereinafter, producing a new embodiment by appropriately combining characteristic parts of the embodiments and modifications is expected from the beginning. In Examples described hereinafter, the same components in the drawings are denoted by the same symbols, and redundant explanations are thus omitted. In the drawings, schematic views are included, and thus, the ratio of dimensions, such as width, length, and height, of a member is not always the same in different figures. In the following description, the nonaqueous electrolyte secondary battery is a prismatic secondary battery and the electrode is an electrode of a prismatic secondary battery; however, the nonaqueous electrolyte secondary battery may be a cylindrical secondary battery, and the electrode may be an electrode of a cylindrical secondary battery. Among components described hereinafter, components not described in an independent claim showing the broadest concept are optional and not essential.

Figure 1:
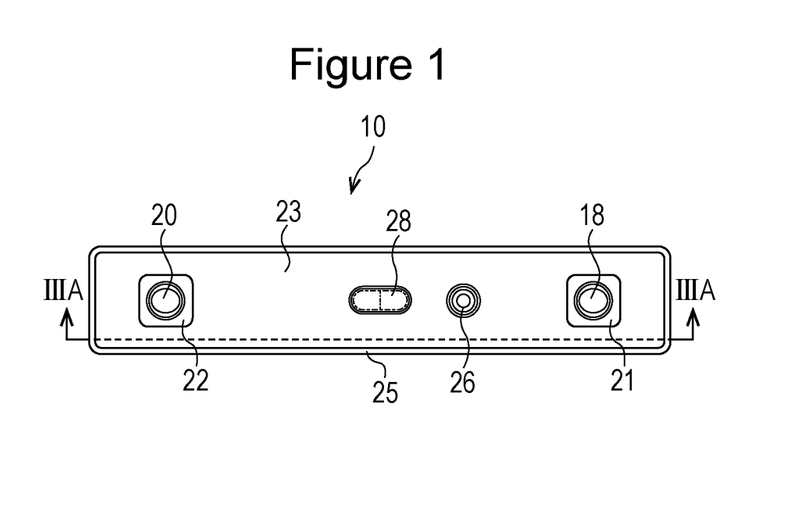
FIG. 1 is a plan view of a prismatic secondary battery according to an embodiment of a nonaqueous electrolyte secondary battery of the present disclosure.
Figure 2:
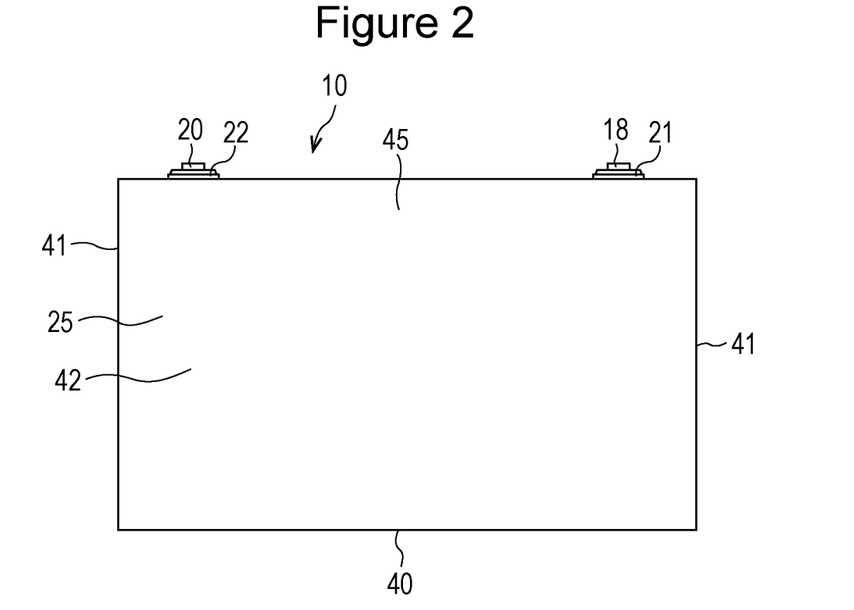
FIG. 2 is a front view of the prismatic secondary battery.
Figure 3A:
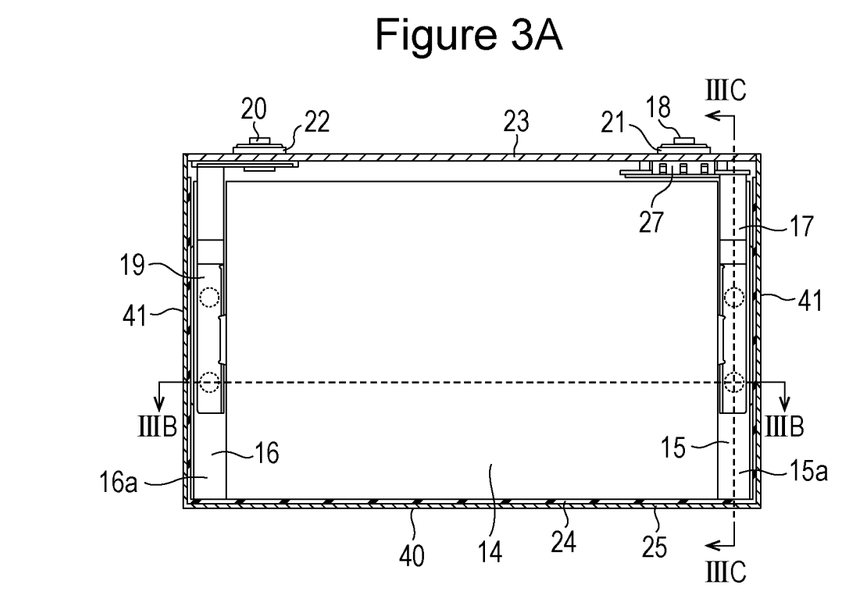
FIG. 3A is a partial cross-sectional view taken along line IIIA-IIIA in FIG. 1.
Figure 5:
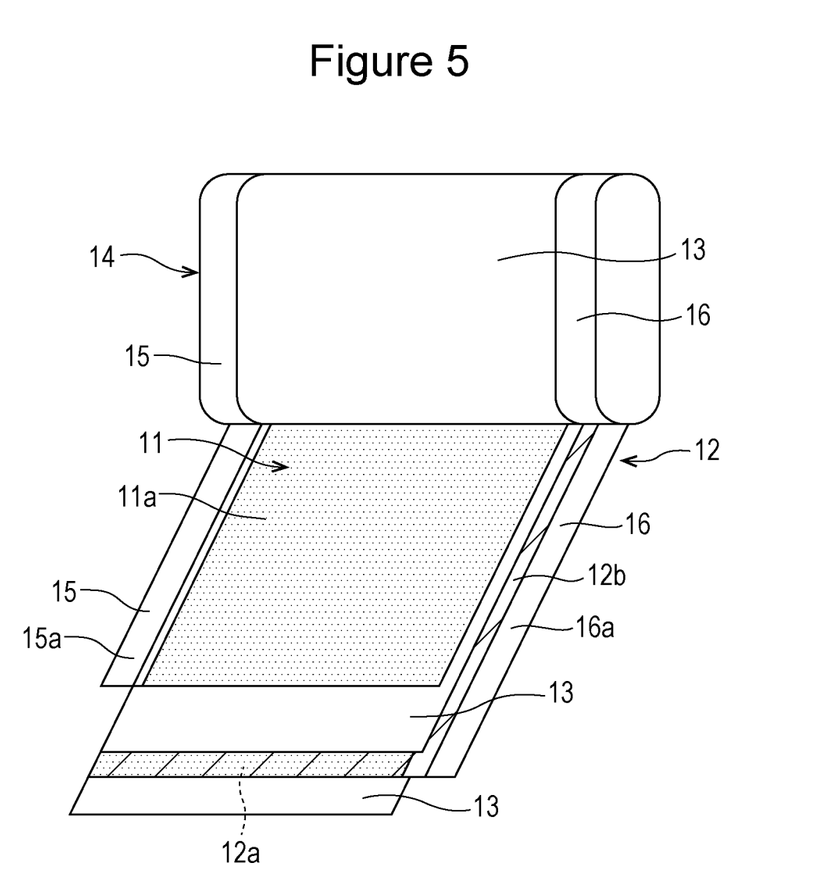
FIG. 5 is a perspective view of the flat wound electrode body included in the prismatic secondary battery, with the wound end portion unfolded.

As illustrated in FIG. 1 to FIG. 3 and FIG. 5, a prismatic secondary battery 10 includes a prismatic outer body (prismatic outer can) 25 (see FIG. 1 to FIG. 3), a sealing plate 23 (see FIG. 1), and a flat wound electrode body 14 (see FIG. 3A and FIG. 5). The prismatic outer body 25 is made of, for example, aluminum or an aluminum alloy and has an opening at an end in a height direction. As illustrated in FIG. 2, the prismatic outer body 25 includes a bottom portion 40, a pair of first side surfaces 41, and a pair of second side surfaces 42. The second side surface 42 is larger than the first side surface 41. As illustrated in FIG. 3A, the sealing plate 23 is fitted to the opening of the prismatic outer body 25. The fitting portions of the sealing plate 23 and the prismatic outer body 25 are bonded together to form a prismatic battery case 45.

Figure 4A:
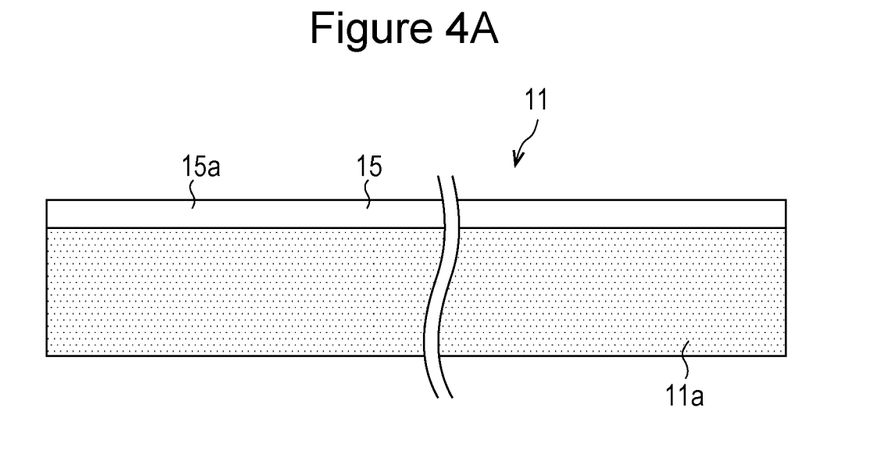
FIG. 4A is a plan view of the positive electrode included in the prismatic secondary battery.

As illustrated in FIG. 5, the wound electrode body 14 has a structure in which a positive electrode 11 and a negative electrode 12 are wound together in a state of being insulated from each other with a separator 13 disposed therebetween. The separator 13 partially covers the outermost surface of the wound electrode body 14, and the negative electrode 12 is disposed outward of the positive electrode 11. As illustrated in FIG. 4A, the positive electrode 11 is formed by applying a positive electrode active material slurry to both surfaces of a strip-shaped positive electrode core 15 formed of an aluminum foil or aluminum alloy foil of about 10 to 20 µm in thickness, performing drying and rolling, and thereafter, cutting the core into strips having predetermined dimensions. The positive electrode active material slurry contains, for example, a positive electrode active material, an electroconductive agent, and a binder. The positive electrode active material slurry does not necessarily contain an electroconductive agent and may contain a thickener. The positive electrode active material is preferably a lithium transition metal composite oxide. The electroconductive agent is preferably a carbon material, such as carbon black. The binder is preferably poly(vinylidene fluoride) (PVdF). N-methyl-2-pyrrolidone (NMP), for example, may be suitably used as the dispersion medium used in producing the positive electrode active material slurry. The positive electrode active material slurry is applied such that a positive electrode core exposed portion 15a, which does not include a positive electrode active material layer 11a on either surface in a longitudinal direction, is formed at an edge of the positive electrode core 15 in a width direction. The positive electrode active material layer 11a preferably has a thickness of 10 to 150 µm. When the positive electrode active material is a lithium transition metal composite oxide, the packing density of the positive electrode active material layer 11a is preferably 1.0 to 4.0 g/cm³.

Figure 4B:
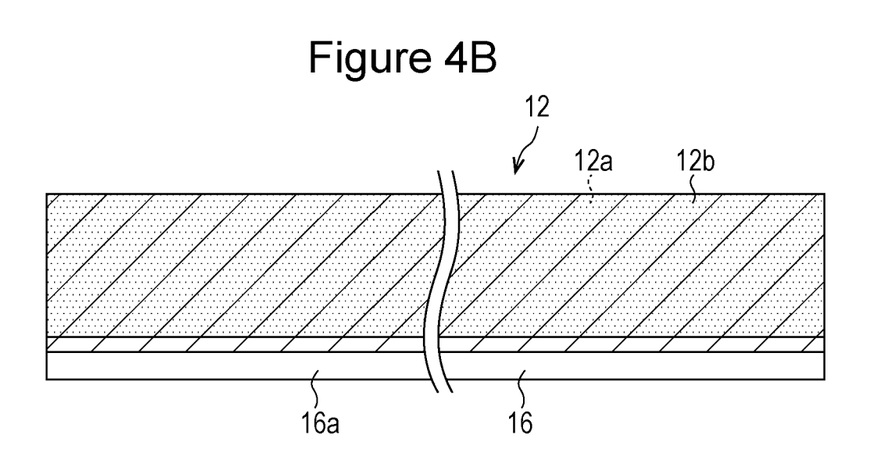
FIG. 4B is a plan view of the negative electrode included in the prismatic secondary battery.

On the other hand, the negative electrode 12 is produced as follows. Specifically, as illustrated in FIG. 4B, first, a negative electrode active material slurry is applied to both surfaces of a strip-shaped negative electrode core 16 formed of a copper foil or copper alloy foil of about 5 to 15 µm in thickness and thereafter, dried and rolled to form a negative electrode active material layer 12a on the negative electrode core. The negative electrode active material slurry contains, for example, a negative electrode active material, an electroconductive agent, and a binder. The negative electrode active material slurry does not necessarily contain an electroconductive agent and may contain a thickener. The negative electrode active material is preferably a carbon material, such as carbon black. The binder is preferably styrene-butadiene rubber (SBR). The thickener is preferably carboxymethyl cellulose (CMC). Water, for example, may be suitably used as the dispersion medium used in producing the negative electrode active material slurry. The negative electrode active material slurry is applied such that a negative electrode core exposed portion, which does not include the negative electrode active material layer 12a on either surface in the longitudinal direction, is formed. The negative electrode active material layer 12a preferably has a thickness of 10 to 120 µm. When the negative electrode active material is a carbon material, the packing density of the negative electrode active material layer 12a is preferably 1.0 to 2.0 g/cm³.

A negative electrode protecting layer 12b is subsequently formed on the entire surface of the negative electrode active material layer 12a. Specifically, for example, alumina, a binder, and a dispersion medium are mixed together and subjected to a mixing and dispersing treatment with a bead mill to produce a negative electrode protecting layer slurry. The negative electrode protecting layer slurry contains inorganic particles and a binder. For example, an acrylate-based binder or a polyolefin-based binder may be suitably used as the binder. The protecting layer slurry may further contain an electroconductive agent. The produced protecting layer slurry is applied to the entire surface of the negative electrode active material layer 12a and to a portion of the negative electrode core exposed portion in the width direction, and the dispersion medium is removed to form the negative electrode protecting layer 12b containing alumina and the binder on the negative electrode active material layer 12a.

The material forming the negative electrode protecting layer 12b will be fully described. At least one selected from a group consisting of alumina, titania, zirconia, boehmite, and manganese oxide is preferably used for ceramic particles contained in the negative electrode protecting layer 12b. Electroconductive inorganic particles other than such particles may be used as the particles contained in the negative electrode protecting layer 12b. A binder typically used for nonaqueous electrolyte secondary batteries may be used as the binder contained in the negative electrode protecting layer 12b. Specific Examples of the binders contained in the negative electrode protecting layer 12b include copolymers including an acrylonitrile structure, polyimide resins, styrene-butadiene rubber (SBR), ethylene-tetrafluoroethylene copolymers (ETFE), poly(vinylidene fluoride) (PVdF), tetrafluoroethylene resins (PTFE), and carboxymethyl cellulose (CMC). The mass of the ceramic particles relative to the total mass of the negative electrode protecting layer 12b is preferably 85.0 mass % to 99.0 mass % and more preferably 90.0 mass % to 98.5 mass %.

After the negative electrode protecting layer 12b is formed, a negative electrode core exposed portion 16a, which includes neither the negative electrode active material layer 12a nor the negative electrode protecting layer 12b, is provided on both surfaces in the longitudinal direction. Thereafter, the negative electrode core 16, on which the negative electrode active material layer 12a and the negative electrode protecting layer 12b are provided, is cut to have predetermined dimensions to form the negative electrode 12. In FIG. 4B and FIG. 5, a region in which the negative electrode protecting layer 12b is formed is hatched with diagonal lines, and a region in which the negative electrode active material layer 12a is formed is dotted to easily identify such a region, although the negative electrode active material layer 12a is covered with the negative electrode protecting layer 12b and thus cannot actually be seen. Herein, the negative electrode core exposed portion 16a is present only at an edge of the negative electrode core 16 in the width direction, and the positive electrode core exposed portion 15a is present only at the other edge of the positive electrode core 15 in the width direction. However, the positive electrode core exposed portion may be present at each edge of the positive electrode core in the width direction, and the negative electrode core exposed portion may be present at each edge of the negative electrode core in the width direction. The negative electrode protecting layer 12b has lower electroconductive characteristics and higher electrical resistance than the negative electrode active material layer 12a. The negative electrode protecting layer 12b prevents an internal short circuit between the negative electrode active material layer 12a and the positive electrode 11 that may be caused by ingress of an electroconductive foreign object, thereby improving safety.

Figure 6:
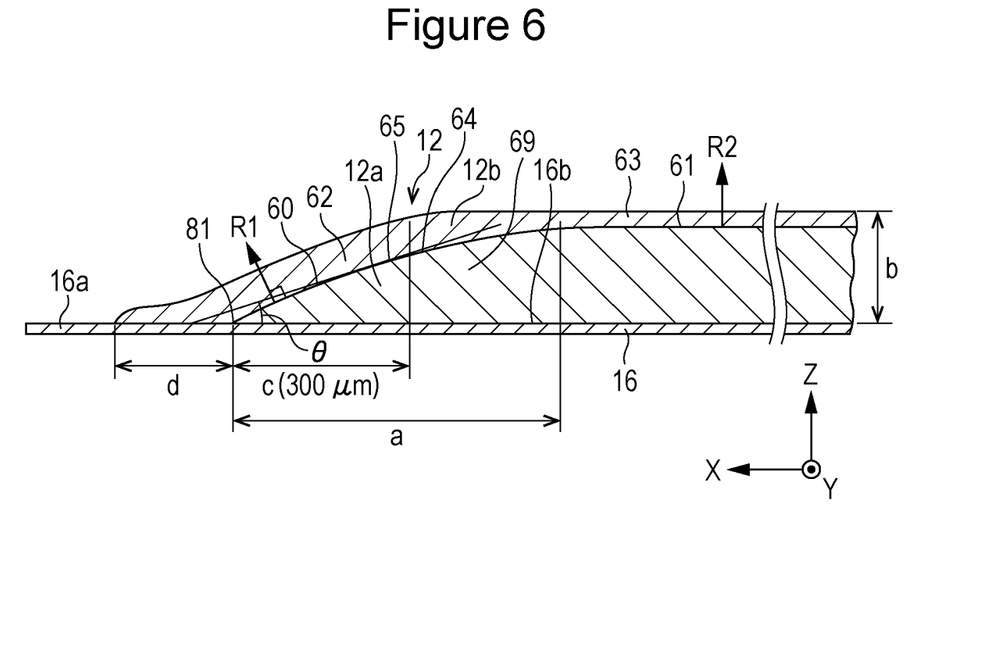
FIG. 6 is a cross-sectional view of a negative electrode core and a negative electrode active material layer and a negative electrode protecting layer, which are close to a surface of the negative electrode core in a thickness direction, when the negative electrode of the prismatic secondary battery is cut along a plane including a width direction and the thickness direction of the negative electrode core.

In the negative electrode 12 according to the present disclosure, neither the negative electrode active material layer 12a nor the negative electrode protecting layer 12b has a uniform thickness. Next, the relation between the position in the width direction of the negative electrode core 16 and the thickness of the negative electrode active material layer 12a and the negative electrode protecting layer 12b will be described. As illustrated in FIG. 6, a first surface 60 and a second surface 61, which face away from the negative electrode core 16 in the thickness direction (Z direction), are included in the negative electrode active material layer 12a. The distance from the second surface 61 to the negative electrode core 16 in the Z direction is substantially constant at any position in the width direction (X direction). In the cross-sectional view of the linearly extending negative electrode core 16 in FIG. 6, the second surface 61 has a flat shape. The second surface 61 may extend from a position away by a certain distance from the negative electrode core exposed portion 16a, which is disposed at one end of the negative electrode core 16 in the X direction, to the other end in the X direction.

On the other hand, the first surface 60 is closer than the second surface 61 to the one end of the negative electrode core 16 in the X direction. The first surface 60 forms a part of a surface of the negative electrode active material layer 12a in region c, and such a surface faces away from the negative electrode core 16 in the Z direction. As illustrated in FIG. 6, region c extends from an edge 81 at the end of the negative electrode active material layer 12a to a boundary 300 μm away from the edge 81 in the X direction. The first surface 60 becomes closer to the negative electrode core 16 in the Z direction toward the end thereof in the X direction. The first surface 60 forms a part of an inclined surface 65, which forms a part of an outer surface 64 of the negative electrode active material layer 12a. The outer surface 64 faces away from the negative electrode core 16 in the Z direction. The inclined surface 65 becomes closer to the negative electrode core 16 toward an end thereof in the X direction. The first surface 60 and the inclined surface 65 extend in a direction oblique to the negative electrode core 16. The negative electrode active material slurry possesses fluidity, and thus, a portion of the negative electrode active material slurry transfers from the applied region in the X direction. Such transfer of the portion of the negative electrode active material slurry forms the inclined surface 65.

With reference to FIG. 6, regarding a first portion 62 covering the first surface 60 and a second portion 63 covering the second surface 61, which are included in the negative electrode protecting layer 12b, the average value of the first thickness of the first portion 62 in the R1 direction normal to the first surface 60 is 1.7 or more times larger than the maximum value of the second thickness of the second portion 63 in the R2 direction normal to the second surface 61. The first thickness is more preferably 2.7 or more times larger than the second thickness and still more preferably 3.3 or more times. The first thickness is preferably 2 to 100 μm, more preferably 3 to 50 μm, and still more preferably 5 to 30 μm.

The present inventors found that during the processing of an electrode including an active material layer covered with a protecting layer, detachment is likely to occur in a thin end portion of the active material layer in the width direction. The present inventors presume that such detachment occurs due to the following mechanism. Local deformation of an electrode at a low-stiffness portion including a thin active material layer is likely to cause a crack in the active material layer. Such a crack is likely to decrease the contact area between the active material layer and the core. Thus, a force that fixes the active material layer to the core decreases, thereby causing detachment of the active material layer.

On the other hand, regarding the negative electrode 12 according to the present disclosure, the negative electrode protecting layer 12b does not have a uniform thickness, and as described above, the first thickness is 1.7 or more times larger than the second thickness. A portion of the negative electrode protecting layer 12b that covers the first surface 60 has a larger thickness than a portion of the negative electrode protecting layer 12b that covers the second surface 61, and thus, the end portion of the negative electrode 12 reliably has sufficient stiffness. This decreases the occurrence of a crack in a region of the negative electrode active material layer 12a that extends from the edge 81 to a boundary 300 μm away from the edge 81 in the width direction and that is a portion in which a crack is particularly likely to occur. Therefore, detachment of the negative electrode active material layer 12a is suppressed.

The reason that detachment of the negative electrode active material layer 12a is effectively suppressed when the first thickness is 1.7 times larger than the second thickness will be described in Examples below with reference to Table 1 and FIG. 7. The negative electrode 12 in which the first thickness is 1.7 times larger than the second thickness can be readily produced by, for example, increasing the amount of negative electrode protecting layer slurry discharged from a nozzle (not shown) onto the inclined surface 65 of the negative electrode active material layer 12a relative to the amount of negative electrode protecting layer slurry discharged from the nozzle onto a portion of the negative electrode active material layer 12a other than the inclined surface 65.

In the cross-sectional view in FIG. 6, assume that tilt angle θ is defined as an angle that is formed between a tangent to the first surface 60 and a surface 16b of the negative electrode core 16 and that is 90° or less, the negative electrode active material layer 12a being formed on the surface 16b. In such a case, the maximum tilt angle θ may be any angle less than 90° and may be, for example, 70° or less or 65° or less. If the maximum tilt angle θ is 60° or less, the detachment is typically likely to occur; however, according to the present disclosure, the detachment is effectively suppressed, and the technique according to the present disclosure exhibits significant effects and advantages. Furthermore, if the maximum tilt angle θ is 45° or less, the technique according to the present disclosure exhibits particularly significant effects and advantages. If the maximum tilt angle θ is 30° or less, the technique according to the present disclosure exhibits the most significant effects and advantages.

In the cross-sectional view in FIG. 6, regarding the negative electrode active material layer 12a, the dimension of an inclined portion 69 in the X direction is defined as a. The inclined portion 69 has the outer surface 64, which faces away from the negative electrode core 16 in the Z direction and which becomes closer to the negative electrode core 16 toward an end thereof in the X direction. The maximum total thickness of the negative electrode protecting layer 12b and the negative electrode active material layer 12a, which is formed on the surface 16b of the negative electrode core 16, is defined as b. In such a case, (b/a) may be less than 1/30. Preferably, (b/a) is 1/30 or more, because the area of a region of the negative electrode active material layer 12a that has large thickness is readily increased in plan view, and the density per unit area of the negative electrode active material layer 12a can be increased, thereby readily increasing the battery capacity. Furthermore, the dimension of the negative electrode core exposed portion 16a in the width direction is readily increased, and thus, the connection of a negative electrode current collector 19 (see FIG. 3A) to the negative electrode core exposed portion 16a, which will be described later, is readily performed. More preferably, (b/a) is 1/10 or more.

In addition, (b/a) may be more than 3. When (b/a) is 3 or less, the detachment is typically likely to occur; however, according to the present disclosure, the detachment is effectively suppressed, and the technique according to the present disclosure exhibits significant effects and advantages. More preferably, (b/a) is 2 or less. The negative electrode protecting layer is not necessarily in contact with the negative electrode core. However, as in this embodiment, a portion of the negative electrode protecting layer 12b is preferably formed on an end portion of the negative electrode core 16 in the width direction. More specifically, length d (see FIG. 6) of a portion of the negative electrode protecting layer 12b that is formed on the negative electrode core 16 is preferably more than 0 mm and 2 mm or less in the width direction of the negative electrode core 16.

Next, the wound electrode assembly 14 will be described. As illustrated in FIG. 5, the positive electrode 11 and the negative electrode 12 are offset from each other in the width direction of the wound electrode body 14 (width direction of the positive electrode 11 and the negative electrode 12) to prevent the positive electrode core exposed portion 15a and the negative electrode active material layer 12a from overlapping each other and to prevent the negative electrode core exposed portion 16a and the positive electrode active material layer 11a from overlapping each other. The positive electrode 11 and the negative electrode 12 are wound together in a state of being insulated from each other with the separator 13 disposed therebetween, and the resulting body is formed to be flat to produce the flat wound electrode body 14. The wound electrode body 14 includes layers of the positive electrode core exposed portion 15a stacked on each other at an end thereof in a direction in which the winding axis extends, and layers of the negative electrode core exposed portion 16a stacked on each other at the other end. The direction in which the winding axis extends coincides with a width direction of the strip-shaped positive electrode 11, the strip-shaped negative electrode 12, and the strip-shaped separator 13 when such electrodes and the separator are unfolded to form a rectangular shape. A microporous film made of polyolefin is preferably used as the separator 13. Preferably, the separator 13 has a width large enough to cover the positive electrode active material layer 11a and has a larger width than the negative electrode active material layer 12a.

The layers of the positive electrode core exposed portion 15a stacked on each other are electrically connected to a positive electrode terminal 18 via a positive electrode current collector 17 (see FIG. 3A), and the layers of the negative electrode core exposed portion 16a stacked on each other are electrically connected to a negative electrode terminal 20 via the negative electrode current collector 19 (see FIG. 3A), which will be described later. As illustrated in FIG. 3A, a current interruption device 27, which operates when the internal gas pressure of the battery case 45 increases to a predetermined value or higher, is preferably disposed between the positive electrode current collector 17 and the positive electrode terminal 18, which will not be described in detail.

As illustrated in FIG. 1, FIG. 2, and FIG. 3A, the positive electrode terminal 18 is fixed to the sealing plate 23 via an insulating member 21, and the negative electrode terminal 20 is fixed to the sealing plate 23 via an insulating member 22. The sealing plate 23 includes a gas discharging valve 28, which opens when the internal gas pressure of the battery case 45 becomes higher than the operating pressure of the current interruption device 27. The positive electrode current collector 17, the positive electrode terminal 18, and the sealing plate 23 are each formed of aluminum or an aluminum alloy, and the negative electrode current collector 19 and the negative electrode terminal 20 are each formed of copper or a copper alloy. As illustrated in FIG. 3C, the flat wound electrode body 14 is inserted, in a state of being surrounded by an insulating sheet (resin sheet) 24 having insulating properties except a portion to be near the sealing plate 23, into the prismatic outer body 25 having an opening.

Figure 3B:
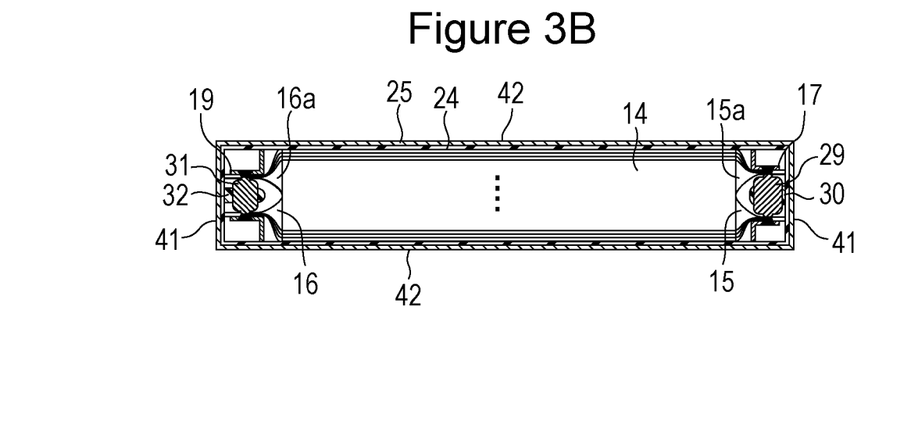
FIG. 3B is a partial cross-sectional view taken along line IIIB-IIIB in FIG. 3A.
Figure 3C:
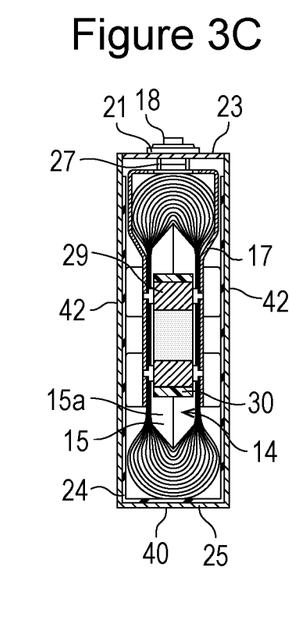
FIG. 3C is a cross-sectional view taken along line IIIC-IIIC in FIG. 3A.

As illustrated in FIG. 3B and FIG. 3C, the layers of the wound positive electrode core exposed portion 15a of the positive electrode 11, which are stacked on each other, converge toward the center portion in the thickness direction and are divided into two portions. The two portions each converge, and a positive electrode intermediate member 30 is disposed therebetween. The positive electrode intermediate member 30 is made of a resin material. One or more, for example, two electroconductive positive electrode conductive members 29 are disposed on the positive electrode intermediate member 30.

The layers of the wound negative electrode core exposed portion 16a of the negative electrode 12, which are stacked on each other, converge toward the center portion in the thickness direction and are divided into two portions. The two portions each converge, and a negative electrode intermediate member 32 is disposed therebetween. The negative electrode intermediate member 32 is made of a resin material. One or more, for example, two negative electrode conductive members 31 are disposed on the negative electrode intermediate member 32.

The positive electrode conductive member 29 and the converged layers of the positive electrode core exposed portion 15a that are disposed at both ends of the positive electrode conductive member 29 in a direction in which the positive electrode conductive member 29 extends are electrically connected to each other by, for example, resistance welding. The converged layers of the positive electrode core exposed portion 15a and the positive electrode current collector 17 disposed outward of the layers of the positive electrode core exposed portion 15a in the depth direction of the battery case 45 are also electrically connected to each other by, for example, resistance welding. In the same manner, the negative electrode conductive member 31 and the converged layers of the negative electrode core exposed portion 16a that are disposed at both ends of the negative electrode conductive member 31 are electrically connected to each other by, for example, resistance welding. The converged layers of the negative electrode core exposed portion 16a and the negative electrode current collector 19 disposed outward of the layers of the negative electrode core exposed portion 16a in the depth direction of the battery case 45 are also electrically connected to each other by, for example, resistance welding. The positive electrode current collector 17 is electrically connected to the positive electrode terminal 18, and the negative electrode current collector 19 is electrically connected to the negative electrode terminal 20.

The positive electrode conductive member 29 is preferably made of aluminum or an aluminum alloy, and the negative electrode conductive member 31 is preferably made of copper or a copper alloy. Herein, as an example, resistance welding is performed to connect the positive electrode core exposed portion 15a and the positive electrode current collector 17 to each other and to connect the negative electrode core exposed portion 16a and the negative electrode current collector 19 to each other; however, laser welding or ultrasound welding may be performed. The positive electrode intermediate member 30 and the negative electrode intermediate member 32 are not necessarily used.

The wound electrode body 14, to which, for example, the positive electrode current collector 17, the negative electrode current collector 19, and the sealing plate 23 are attached, is disposed in the prismatic outer body 25. The wound electrode body 14 is preferably inserted into the prismatic outer body 25, in a state of being disposed in the box-shaped or bag-shaped insulating sheet 24. Afterwards, the fitted portions of the sealing plate 23 and the prismatic outer body 25 are subjected to laser welding, and thereafter, a nonaqueous electrolyte solution is poured through an electrolyte solution inflow hole 26. Then, the electrolyte solution inflow hole 26 is sealed to produce the prismatic secondary battery 10. The electrolyte solution inflow hole 26 is sealed, for example, with a blind rivet or by welding.

The prismatic secondary batteries 10 or groups of the prismatic secondary batteries 10 are connected to each other in series, parallel, or mixture of both and used for various applications. Herein, the wound electrode body 14 is disposed with the winding axis parallel to the bottom portion 40 of the prismatic outer body 25; however, such a wound electrode body may be disposed with the winding axis perpendicular to the bottom portion 40 of the prismatic outer body 25.

The positive electrode active material may be appropriately selected from compounds that can bind and release lithium ions reversibly and is preferably a lithium transition metal composite oxide. For example, lithium transition metal composite oxides that can bind and release lithium ions reversibly and that are represented by $LiMO_2$ (M is at least one of Co, Ni, and Mn), such as $LiCoO_2$, $LiNiO_2$, $LiNi_yCo_{1-y}O_2$ (y=0.01 to 0.99), $LiMnO_2$, and $LiCo_xM-n_yNi_zO_2$ (x+y+z=1), $LiMn_2O_4$, and $LiFePO_4$ may be used alone or in a combination of two or more. Furthermore, a lithium cobalt composite oxide to which a different metal element, such as zirconium, magnesium, aluminum, or tungsten is added may be used.

Examples of the binder for the positive electrode active material layer 11a include fluororesins, such as polytetrafluoroethylene (PTFE) and polyvinylidene fluoride (PVdF), polyacrylonitrile (PAN), polyimides, acrylic resins, and polyolefins. Examples of the electroconductive agent for the positive electrode active material layer 11a include carbon black, acetylene black, furnace black, KETJEN-BLACK, and graphite.

A solvent for a nonaqueous electrolyte may be any solvent that has been used for nonaqueous electrolyte secondary batteries. Examples of the solvent include cyclic carbonates, such as ethylene carbonate (EC), propylene carbonate (PC), butylene carbonate, and vinylene carbonate (VC); chain carbonates, such as dimethyl carbonate (DMC), methylethyl carbonate (MEC), and diethyl carbonate (DEC); ester-containing compounds; ether-containing compounds; nitrile-containing compounds; and amide-containing compounds, such as dimethylformamide. Such compounds may be used alone or in a combination of two or more.

Furthermore, a known lithium salt that has been typically used for nonaqueous electrolyte secondary batteries may be used as a solute for the nonaqueous electrolyte. Specific examples of the lithium salt include $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, and $LiPF_2O_2$ and mixtures thereof. A lithium salt, such as lithium bis(oxalate)borate (LiBOB), in which an oxalato complex is the anion may be used as the solute. The above solutes may be used alone or in a combination of two or more. The concentration of the solute is not particularly limited and desirably 0.8 to 1.7 mol per liter of a nonaqueous electrolyte solution.

The negative electrode active material may be any material that can bind and release lithium ions reversibly. Examples of such a material include carbon materials, silicon materials, lithium metal, metal and alloy materials that form an alloy with lithium, and metal oxides. A carbon material is preferably used as the negative electrode active material. Examples of such a carbon material include natural graphite, synthetic graphite, mesophase pitch-based carbon fibers (MCF), mesocarbon microbeads (MCMB), coke, and hard carbon. In particular, to enhance the high-rate charging/discharging characteristics, a carbon material produced by covering a graphite material with low crystalline carbon is preferably used as the negative electrode active material.

A binder for the negative electrode active material layer 12a may be, for example, a fluororesin, PAN, a polyimide resin, an acrylic resin, or a polyolefin resin, and is preferably styrene-butadiene rubber (SBR) or a denaturant thereof. Examples of an electroconductive agent for the negative electrode active material layer 12a include carbon black, acetylene black, furnace black, KETJENBLACK, and graphite.

The separator is preferably made of, for example, polyolefin. Furthermore, for example, a separator made of polyethylene, a separator including a polypropylene layer formed on the polyethylene surface, or a polyethylene separator having a surface to which an aramid-based resin is applied may be used as the separator. At the interface between the positive electrode and the separator or the interface between the negative electrode and the separator, a layer containing an inorganic filler that has been used may be formed.

Hereinafter, Examples according to the present disclosure will be fully described with reference to Table 1 and FIG. 7. Table 1 shows the cut detachment area of the negative electrode active material layers of the respective negative electrodes having different negative electrode protecting layers. The present disclosure is not limited to Examples. In Table 1, "first thickness" refers to the average value of the first thickness of the first portion in the direction normal to the first surface, and "second thickness" refers to the maximum value of the second thickness of the second portion in the direction normal to the second surface.

TABLE 1

| | Thickness of negative electrode protecting layer (μm) | | Cut detachment area ratio of negative electrode active material layer | Negative electrode protecting layer thickness ratio (first thickness/ second thickness) |
|---|---|---|---|---|
| | First thickness | Second thickness | | |
| Example 1 | 5 | 3 | 0.09 | 1.7 |
| Example 2 | 8 | 3 | 0.03 | 2.7 |
| Example 3 | 10 | 3 | 0.00 | 3.3 |
| Example 4 | 15 | 3 | 0.00 | 5.0 |
| Example 5 | 20 | 3 | 0.00 | 6.7 |
| Example 6 | 30 | 3 | 0.00 | 10.0 |
| Comparative Example 1 | 3 | 3 | 0.17 | 1.0 |
| Comparative Example 2 | 0 | 0 | 0.54 | — |

PRODUCTION OF NEGATIVE ELECTRODES IN EXAMPLES AND COMPARATIVE EXAMPLES

Production of Negative Electrode in Example 1

Graphite was used as the negative electrode active material. The negative electrode active material, a sodium salt of carboxymethyl cellulose (CMC), and styrene-butadiene rubber (SBR) dispersion were mixed together in a solid mass ratio of 98.7:0.7:0.6 to prepare a negative electrode active material slurry in which water was used as the dispersion medium. Next, the negative electrode active material slurry was applied to both surfaces of the negative electrode core formed of a strip-shaped copper foil of 130 mm in width (application width 100 mm). After dried, the coating film was pressed to form a negative electrode active material layer having a packing density of 1.07 g/cm$^3$ on each surface of the negative electrode core. The produced negative electrode active material layer consists of an inclined portion formed on an end portion of the negative electrode core in the width direction and a flat portion having a uniform thickness formed on a portion of the negative electrode core on which the inclined portion was not formed. Thereafter, an alumina powder, a binder made of a copolymer including an acrylonitrile structure, and N-methyl-2-pyrrolidone (NMP) as the dispersion medium were mixed together in a mass ratio of 30:0.9:69.1, and the mixture was subjected to a mixing and dispersing treatment with a bead mill to produce a negative electrode protecting layer slurry. Then, the produced negative electrode protecting layer slurry was applied to the negative electrode active material layer so as to cover the entire surface of the negative electrode active material layer. Afterwards, NMP used as the dispersion medium was removed by drying to form a protecting layer made of alumina and the binder on the surface of the negative electrode active material layer. At this time, a negative electrode core exposed portion where the negative electrode core was exposed was formed in an end region of the negative electrode core in the width direction. When the negative electrode protecting layer slurry was applied, the amount of negative electrode protecting layer slurry discharged from a nozzle onto the inclined portion was larger than the amount of negative electrode protecting layer slurry discharged from a nozzle onto the flat portion other than the inclined portion. Due to such a nonuniform discharge of the negative electrode protecting layer slurry, the average value of the first thickness of a first portion of the negative electrode protecting layer in the direction normal to a first surface was 5 μm. The first portion was formed on the first surface. The first surface formed a part of an inclined surface of the inclined portion, the inclined surface facing away from the negative electrode core in the thickness direction, and was formed in a region that extends from the edge at one end of the negative electrode active material layer to a boundary 300 μm away from the edge in the width direction. The maximum value of the second thickness of a second portion of the negative electrode protecting layer in the direction normal to the second surface was 3 μm. The second portion was formed on the second surface. The second surface formed a part of an outer surface of the negative electrode active material layer, the outer surface facing away from the negative electrode core in the thickness direction, and was positioned closer than the first surface to the other end of the negative electrode active material layer in the width direction, and the distance from the second surface to the negative electrode core in the thickness direction was substantially constant. Thereafter, the formed strip-shaped negative electrode was cut to have a predetermined electrode size to produce a negative electrode.

Production of Negative Electrode in Example 2

A negative electrode was produced in the same manner as that in Example 1, except that the average value of the first thickness of the first portion in the direction normal to the first surface was changed from 5 μm to 8 μm.

Production of Negative Electrode in Example 3

A negative electrode was produced in the same manner as that in Example 1, except that the average value of the first thickness of the first portion in the direction normal to the first surface was changed from 5 μm to 10 μm.

Production of Negative Electrode in Example 4

A negative electrode was produced in the same manner as that in Example 1, except that the average value of the first thickness of the first portion in the direction normal to the first surface was changed from 5 μm to 15 μm.

Production of Negative Electrode in Example 5

A negative electrode was produced in the same manner as that in Example 1, except that the average value of the first thickness of the first portion in the direction normal to the first surface was changed from 5 μm to 20 μm.

Production of Negative Electrode in Example 6

A negative electrode was produced in the same manner as that in Example 1, except that the average value of the first thickness of the first portion in the direction normal to the first surface was changed from 5 μm to 30 μm.

Production of Negative Electrode in Comparative Example 1

A negative electrode was produced in the same manner as that in Example 1, except that the average value of the first thickness of the first portion in the direction normal to the first surface was changed from 5 μm to 3 μm. In other words, a negative electrode including a negative electrode protecting layer having a uniform thickness of 3 μm at any position in the width direction of the negative electrode core was produced.

Production of Negative Electrode in Comparative Example 2

A negative electrode was produced in the same manner as that in Example 1, except that a negative electrode protecting layer was not formed.

Evaluation of Detachment of Negative Electrode Active Material Layer in Negative Electrode in Each of Examples and Comparative Examples The cut detachment area ratio of a negative electrode active material layer was calculated in accordance with the following steps (1) to (5), and the ease of detachment in the negative electrode was evaluated.

(1) First, each produced negative electrode was cut along a plane including the width direction and the thickness direction on a white A4 paper sheet. The negative electrode was placed such that the longitudinal direction of the negative electrode coincided with the longitudinal direction of the A4 paper sheet, and that the center of the A4 paper sheet coincided with the center of the negative electrode in the width direction in plan view. Under such a condition, the negative electrode was cut such that the cross section passed through the center of the A4 paper sheet in plan view.

(2) An image was taken from the upper side in the direction normal to the white paper sheet surface (from directly above the white paper sheet) such that the white paper sheet and a detached negative electrode active material layer were entirely in the image.

(3) The image was transferred to image processing software Image J, and binarization and image analysis were performed. In binarization, image processing was performed such that the region in which the negative electrode active material layer was present became black.

(4) In accordance with the image, the ratio of the area of a region in which the detached negative electrode active material layer was present to the area of the white paper sheet, in other words, the cut detachment area ratio, was calculated. Thus, when the area of the white paper sheet is multiplied by the cut detachment area ratio, the active-material detachment area, which refers to the area of a region in which the detached negative electrode active material layer is present on the white paper sheet, is calculated.

(5) The cut detachment area ratio of each negative electrode was calculated in (4), and a negative electrode having a cut detachment area ratio of less than 0.1 was evaluated as a good negative electrode in which the detachment of the negative electrode active material layer is unlikely to occur.

Figure 7:
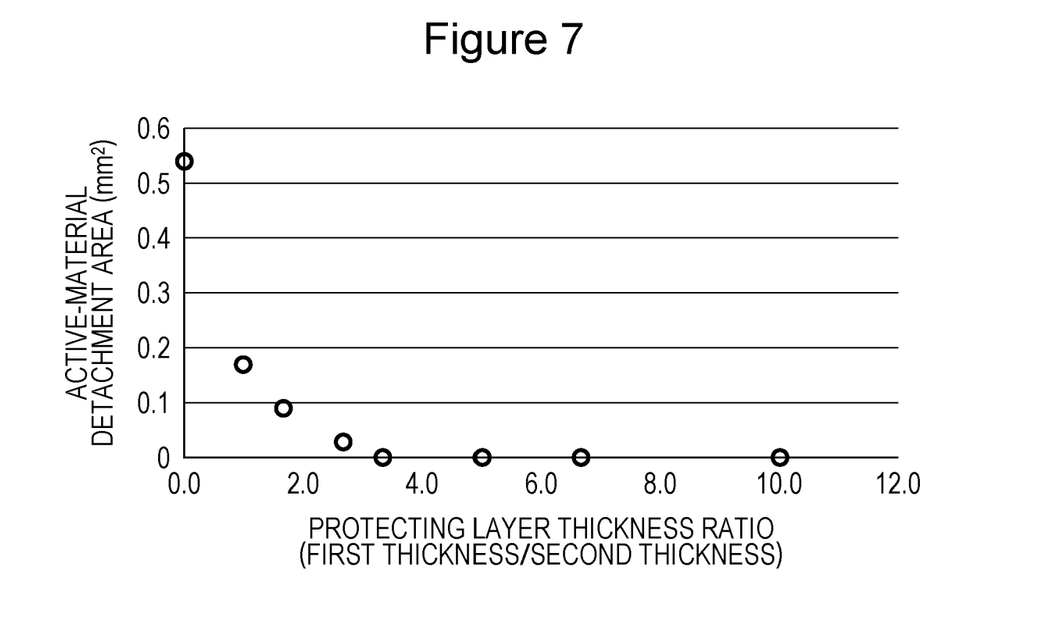
FIG. 7 is a graph of the relation between the protecting layer thickness ratio and the active-material detachment area.

FIG. 7 is a graph of the relation between the protecting layer thickness ratio (average value of first thickness of first portion in direction normal to first surface/maximum value of second thickness of second portion in direction normal to second surface) and the active-material detachment area.

As shown in Table 1 and FIG. 7, in the present Examples (present test examples), as the protecting layer thickness ratio increases, the detachment area of the negative electrode active material layer decreases. The reason for this is probably as follows. The thickness of a portion of the protecting layer that is at an end portion of the negative electrode increases, and thus, the stiffness of the end portion of the negative electrode increases. Therefore, the occurrence of a crack in the end portion of the negative electrode decreases, thereby suppressing the detachment of the negative electrode active material layer.

In comparison with the negative electrode in Comparative Example 1 having a cut detachment area ratio of 0.17, which has a protecting layer thickness ratio of 1.0 and includes the negative electrode protecting layer having a uniform thickness, the negative electrode in Example 1 having a protecting layer thickness ratio of 1.7 has a significantly low cut detachment area ratio of 0.09, which is less than 0.1. Thus, the excellent effect of suppressing detachment of the negative electrode active material layer is exhibited. The negative electrode in Example 2 having a protecting layer thickness ratio of 2.7 has a drastically low cut detachment area ratio of 0.03 and exhibits a significant effect of suppressing detachment of the negative electrode active material layer. Furthermore, detachment of the negative electrode active material layer does not occur in the negative electrodes having a protecting layer thickness ratio of 3.3 or more.

Thus, in a prismatic secondary battery including a negative electrode having a protecting layer thickness ratio of 1.7 or more, detachment of the negative electrode active material layer is unlikely to occur, and thus, the durability is improved. In a prismatic secondary battery including a negative electrode having a protecting layer thickness ratio of 2.7 or more, detachment of the negative electrode active material layer is significantly suppressed, and thus, the durability is further improved. In a prismatic secondary battery including a negative electrode having a protecting layer thickness ratio of 3.3 or more, detachment of the negative electrode active material layer is substantially prevented, and thus, a prismatic secondary battery having significantly excellent durability can be produced.

The present disclosure is not limited to the above embodiments, Examples, and modified Examples. Various improvements and modifications are available in the scope of Claims of the present application and the scope of equivalence of Claims.

For example, in Examples in Table 1 and FIG. 7, regarding the negative electrode protecting layer 12b, the thickness of the first portion 62, which covers the first surface 60 of the negative electrode active material layer 12a, in the direction normal to the first surface 60 is uniform at any position in the width direction of the negative electrode core 16. However, regarding the negative electrode protecting layer, the thickness of the first portion, which covers the first surface of the negative electrode active material layer, in the direction normal to the first surface may be different at some positions in the width direction of the negative electrode core.

For example, in Examples in Table 1 and FIG. 7, regarding the negative electrode protecting layer 12b, the thickness of the second portion 63, which covers the second surface 61 of the negative electrode active material layer 12a, in the direction normal to the second surface 61 is uniform at any position in the width direction of the negative electrode core 16. However, regarding the negative electrode protecting layer, the thickness of the second portion, which covers the second surface of the negative electrode active material layer, in the direction normal to the second surface may be different at some positions in the width direction of the negative electrode core.

In other words, regarding the negative electrode protecting layer, the average thickness of the first portion, which covers the first surface of the negative electrode active material layer, in the direction normal to the first surface is 1.7 or more times larger than the maximum thickness of the second portion, which covers the second surface of the negative electrode active material layer, in a direction normal to the second surface.

Herein, the protecting layer according to the present disclosure is provided in the negative electrode 12; however, the protecting layer according to the present disclosure may be provided in both the positive and negative electrodes, or in the positive electrode instead of in the negative electrode. When the protecting layer according to the present disclosure is provided in the positive electrode, the structures and the features of the active material layer and the protecting layer may be the same as those in the negative electrode.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. An electrode comprising:
a strip-shaped core;
an active material layer disposed on at least one surface of the strip-shaped core in a thickness direction so as to extend in a longitudinal direction of the strip-shaped core; and
a protecting layer that is disposed so as to cover the active material layer and has higher electrical resistance than the active material layer,
wherein the active material layer includes a first surface and a second surface, the first surface facing away from the strip-shaped core in the thickness direction and being formed in a region that extends from an edge of the active material layer at a first end of the active material layer to a boundary 300 μm away from the edge in a width direction, the second surface being positioned closer than the first surface to a second end, opposite the first end, of the active material layer in the width direction, a distance from the second surface to the strip-shaped core in the thickness direction being constant,
regarding the protecting layer, an average value of a first thickness of a first portion covering the first surface in a direction normal to an inclined plane of the first surface is 1.7 or more times larger than a maximum value of a second thickness of a second portion covering the second surface in a direction normal to the second surface, wherein the inclined plane is inclined at an angle of about 30° or less relative to the at least one surface of the strip-shaped core, and
a dimension of an inclined portion of the active material layer in the width direction is defined as a, the inclined portion having an outer surface that faces away from the strip-shaped core in the thickness direction and whose distance to the strip-shaped core in the thickness direction tapers toward the first end in the width direction, wherein the outer surface and the first surface coincide with each other in the region from the edge of the active material layer to the boundary, and
a maximum total thickness of the protecting layer and the active material layer formed on the at least one surface of the strip-shaped core is defined as b,
wherein a ratio of b/a is from 1/30 to 3.

2. The electrode according to claim 1, wherein the average value of the first thickness is 3.3 or more times larger than the maximum value of the second thickness.

3. The electrode according to claim 1, wherein the strip-shaped core is a negative electrode core, and the active material layer is a negative electrode active material layer, and
the negative electrode active material layer contains an active material made of a carbon material.

4. The electrode according to claim 1, wherein
the first thickness is between 5 μm and 30 μm.

5. A nonaqueous electrolyte secondary battery comprising the electrode according to claim 1.

* * * * *